July 20, 1926.
P. S. BAKER
1,593,155
STERILIZING AND COOKING DEVICE
Filed Oct. 21, 1924     2 Sheets-Sheet 2
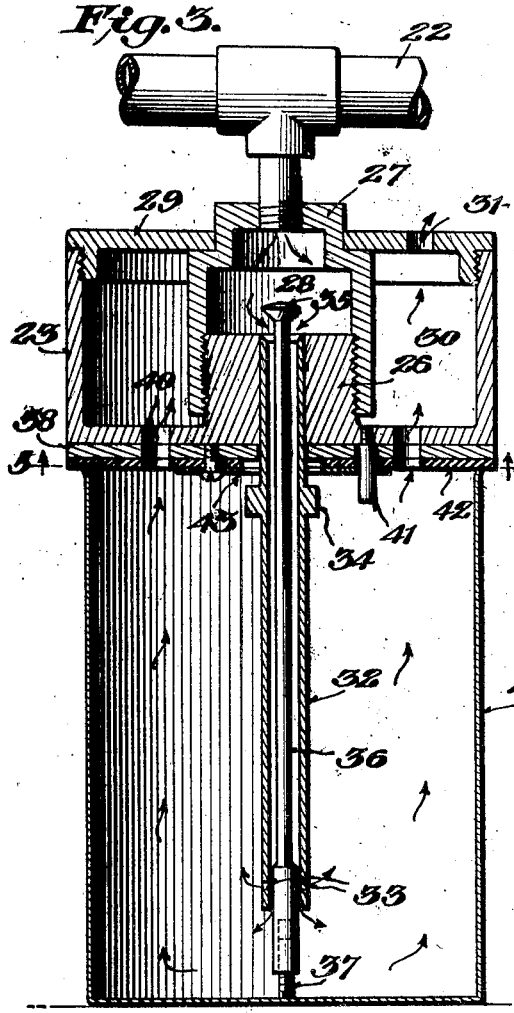
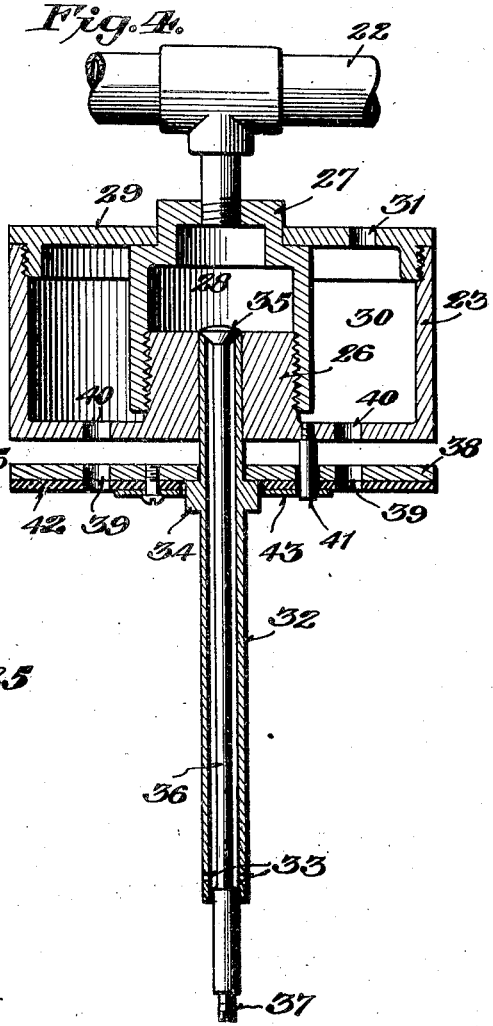
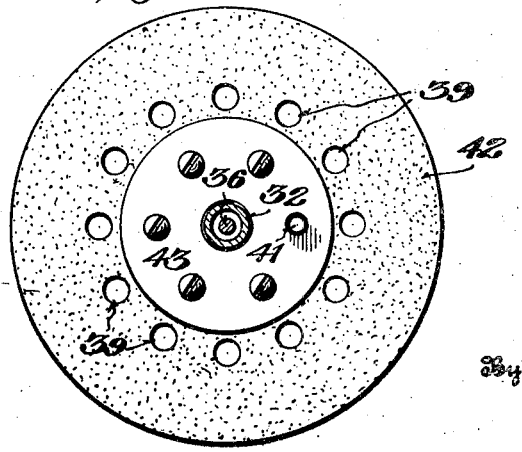
Inventor
Paul Stanley Baker
By Dowell and Dowell
his Attorneys Patented July 20, 1926.

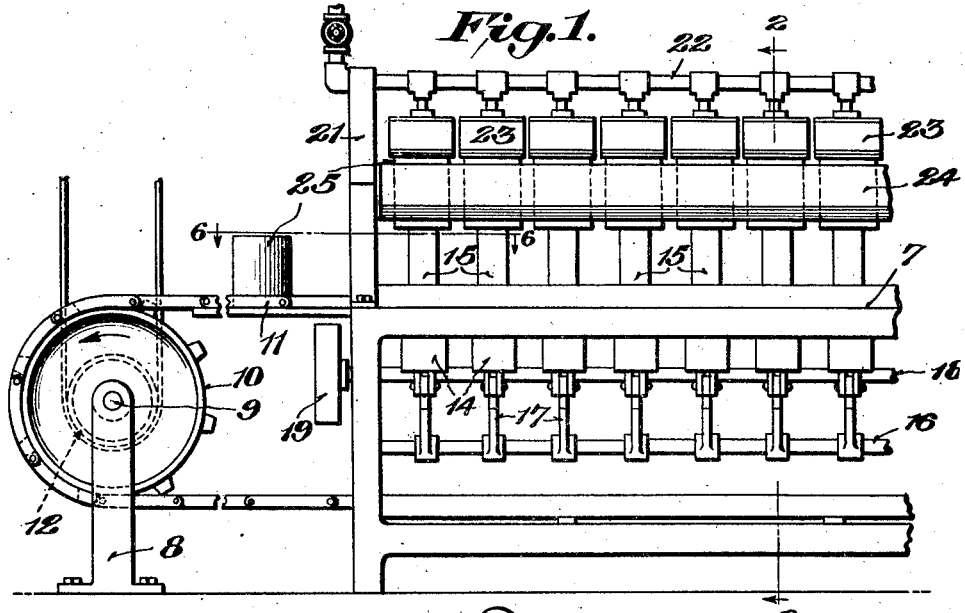
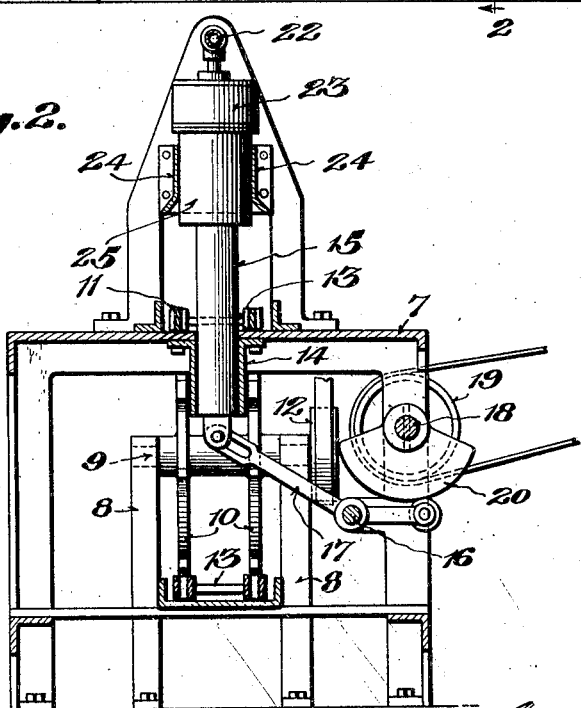
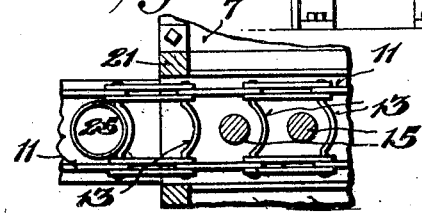

1,593,155

UNITED STATES PATENT OFFICE.

PAUL STANLEY BAKER, OF MUSCATINE, IOWA.

STERILIZING AND COOKING DEVICE.

Application filed October 21, 1924. Serial No. 744,940.

This invention relates to preserving apparatus and more particularly to devices for sterilizing and cooking canned foods and products.

The principal object of the invention is to provide expedient means for sterilizing or cooking various kinds and assortments of canned foods and products, by the injection of any known heating agent, such for instance as steam, hot air or gas, directly into the "tins" or containers in which the products are measured or packed and subsequently sealed, labeled and sold.

Other objects are to provide a device or machine of the character referred to which will be simple in construction, efficient with saving of time and labor in operation, and comparatively inexpensive in cost of manufacture.

The invention will first be hereinafter more particularly described with reference to the accompanying drawings, which are to be taken as a part of this specification, and then pointed out in the claims at the end of the description.

In said drawings, Fig. 1 is a fragmentary side elevation of the automatic machine embodying this invention, a number of unsealed containers being shown elevated to position during the sterilizing or cooking operation, and illustrating the manner in which the open ended containers are conveyed subjacent the heat injectors arranged in series;

Fig. 2 is a slightly enlarged sectional elevation taken transversely of the machine on the line 2—2 of Fig. 1;

Fig. 3 is an enlarged sectional elevation of one of the heat injectors or sterilizing devices taken on a diametrical plane therethrough, an empty food container being also sectionally shown in operative pressure contact therewith for the reception of a heat agency, the supply conduit being shown fragmentarily;

Fig. 4 is a sectional elevation similar to Fig. 3, illustrating the sterilizing device in inoperative position, the food container being omitted;

Fig. 5 is a section taken on the line 5—5 of Fig. 3; and

Fig. 6 is a fragmentary plan view of the conveyor and work platform, taken on the line 6—6 of Fig. 1.

Referring to the drawings in which like reference numerals are used to designate corresponding parts throughout the several views, 7 denotes a working table or platform having the usual supporting standards securable to a floor. An associated standard 8 which is rigidly securable to the floor in like manner and provided with elevated bearings in which the ends of a driven shaft 9 are supportingly journaled, is located adjacent one end of said platform at substantially right angles thereto. A pair of driving sprockets 10 over which co-operable pairs of endless chains 11 engageably pass, are releasably keyed to the shaft 9, and a belt-driven pulley 12 is provided on an extended end of said shaft for imparting rotation thereto from a suitable source of power. The upper span of said co-operable pairs of endless chains, between the sprockets 10 and similar idling sprockets (not shown) at the opposite end of the platform, rests or moves between longitudinal guides provided on its surface, while the lower span moves between guides subjacent the platform, and arcuate cross-ties or bars 13 are employed to unite the pairs of chains at regularly spaced intervals for a purpose to be hereinafter defined. Centrally of the co-operable conveyor chains, and at spaced intervals equal substantially to the regular intervals between cross-bars thereof, alined annular holes of a diameter slightly less than the diameter of the food containers, are provided through the platform, and corresponding cylindrical guide sleeves 14 are secured subjacent thereto, through which plunger rods or bars 15 are reciprocable, the latter being respectively formed or provided at their lower extremities with a pair of depending apertured lugs forming a yoke, the upper extremities of said plungers being preferably "tipped" with an anti-slip washer. Subjacent and longitudinally of the working platform an independent rocking shaft 16 is provided, said shaft being conveniently journaled in bearings formed in the platform standards, a spaced series of bell-crank levers 17 being intermediately secured or keyed thereon at intervals in alinement with the plungers above mentioned and with corresponding arms thereof inclined at substantially the same angle. The longer arms of these levers (as shown) are formed with extremital slots through which bearing pins are passed to pivotally secure the same respectively between the depending apertured lugs or yoke portions of the plungers with which they are alined, although other means of connection therebetween may, if preferred, be employed, while the shorter arms of said levers are provided with extremital anti-friction cam rollers for a purpose which will hereinafter appear. A rotatable shaft 18 is also provided subjacent and longitudinally of the working platform, said shaft being conveniently journaled in bearings formed in the platform standards in a manner similar to the shaft 16. A belt driven pulley 19 (as shown), or a train of speed reduction gears may be employed to impart compartively slow rotation to the shaft 18 from any suitable source of power.

A spaced series of adjustable cams 20 are correspondingly keyed on the shaft 18 at intervals in alinement with the levers 17, said cams being adapted respectively to intermittent pressure contact against the short arm extremities of said levers to depress the latter and cause their simultaneous rocking movement with the shaft 16, thus periodically forcing or lifting the plungers 15 to the position shown in Figs. 1 and 2, said plungers by reason of their weight being normally adapted to rest in lowered position with their upper extremities slightly countersunk below the level of the platform surface. It may here be noted that the conveyor chains 11 are further adapted to be brought intermittently to rest coincident with the elevating movement of these plungers, by means of an automatic clutch release or tripping device (not shown), which may be coordinated with the shaft 18. Upright standards or brackets 21 are secured on the working platform by means of which a valve controlled pipe or conduit 22 for supplying a sterilizing or cooking medium (such as steam or hot gases), is rigidly supported in place above the path of travel of the conveyor chains, said pipe or conduit being successively "tapped" or in open communication with a spaced series of depending auxiliary heat supplying devices 23, by means of ordinary T-shaped pipe couplings. Said brackets further support confronting longitudinal plates 24, said plates being preferably bent or arcuately curved in opposition to each other at corresponding intervals, with their lower edges also outwardly tapered to form a spaced series of guide members in subjacent vertical alinement with the sterilizing devices 23, said guides being respectively adapted partially to embrace the cylindrical walls of food containers 25, for the purpose of holding the latter steady when in elevated position for the sterilizing or cooking operation.

The auxiliary heat supplying devices referred to above are each formed preferably in separable annular parts, comprising a cup-shaped or marginally flanged main-plate 23, having a centrally disposed tubular boss 26 extending upwardly from its bottom, said boss being exteriorly threaded for engagement within a correspondingly interiorly threaded hollow cap 27, the latter being formed with an exterior annular shoulder and adapted to connection with the conduit 22 by means of the T-shaped couplings hereinbefore mentioned, thus providing a central heat chamber or chest 28 in open communication with the main source of heat supply. A centrally apertured closure or top-plate 29, having an annular depending flange adapted to threaded engagement with the marginal flange or cylindrical wall of the main-plate 23, engages snugly upon the shouldered cap 27 with a neck portion of the latter extending centrally therethrough, thus forming a complete housing or double-compartment structure with an annular space or shock chamber 30 surrounding the heat chest 28 and a vent hole 31 for the escape or exhaust of any superfluous heat medium, is provided in said top-plate. It will be understood of course that gaskets or washers may, if desired, be interposed between the main-plate and top-plate to prevent wasteful leakage of heat or vapor, although it is not thought to be necessary. A dependent tube 32 is sweated or otherwise rigidly secured within the tubular boss 26 of the main-plate, said tube being extended to a length somewhat less than the depth of the food containers and provided in its lower extremity with a series of orifices or holes 33 for the emission of a heat agency therethrough. A collar 34 is also provided on said tube intermediate its ends, at a point spaced somewhat apart from the bottom of the main plate, and a valve seat is formed or provided at the upper end or enclosed extremity of the tube upon which a valve 35 is adapted normally to rest. Said valve is carried on the upper end of a weighted rod or stem 36, the latter being extended through and somewhat beyond the lower extremity of the tube 32 and formed at its lower end with an enlarged tubular guide portion which is interiorly threaded to receive a length-adjusting screw 37. A centrally apertured disk or plate 38 of a diameter equal substantially to the diameter of the main-plate is loosely fitted over the tube 32 between its collar 34 and the bottom of the main-plate, said disk being provided with a circumferential series of orifices or holes 39, corresponding with a similar series of holes 40 which are likewise provided through the bottom of the main-plate to thus establish exhaust communication between the pressure elevated food containers and the shock chamber 30. A depending guide pin 41 which extends through an orifice in the plate 38, is screwed into the main plate to maintain alinement of corresponding exhaust holes in the two plates. A packing gasket or flexible washer 42, corresponding substantially with the disk or plate 38 and provided with a series of holes registering with the holes 39 in the latter, is clamped or secured against the under face of said disk or plate by means of a metallic washer 43, which is screwed to the plate. Said disc or plate 38 serves as a temporary cap or seal for open-ended food containers to prevent a splashing or boiling over of their contents upon the introduction of a heat medium thereinto with the opening of the valve 35, as such containers are successively elevated to the position at which said disc or plate is held thereby in pressure contact against the bottom of the main-plate 23 with its exhaust holes in registration with the corresponding holes of the latter as shown in Fig. 3, and permits a more rapid vapor exhaust or relief of pressure within the containers while preventing a latent splashing or bubbling over of their contents as the containers are lowered to close and reseat said valve after the heating or sterilizing treatment has been completed.

In operation, open-ended food containers 25 are successively conveyed longitudinally of the platform 7 by means of the endless chains 11, the spaced arcuate cross-bars 13 of said chain engaging behind the containers to impel them forward at regularly spaced intervals subjacent the auxiliary heat supplying devices or injectors 23, which as hereinbefore stated, are preferably arranged in series.

The shaft 18 carrying the spaced cams 20, is driven simultaneously with the conveyor chains at a relatively slow speed, said chains being brought periodically to rest by a suitable clutch release automatically operable in co-ordination with said shaft so as to leave a series of containers successively underlying the auxiliary heat devices 23 coincident with actuating pressure contact of cams 20 upon the spaced bell-crank levers 17, said containers being thus successively brought into vertical alinement with the plungers 15, so that the pressure of said cams upon said levers, will cause the plungers to be lifted, thereby elevating the containers with their opened top margins in pressure contact against the packing plate 38 of the respective heating devices in the position shown in Fig. 3, such operation also bringing the bottoms of the containers into contact with the adjustment screws in the lower extremities of the valve stems 36, causing the latter to be lifted and unseat the valves 35, whereupon a heat medium (such as steam, superheated steam, hot air or gases), will pass under pressure from the conduit 22 simultaneously through the respective heat chests 28 into the several containers through the emission orifices in the tubes 32 and also around the enlarged portions of the respective valve stems, as indicated by the arrows in Fig. 3, thus introducing a sterilizing or cooking agency into the successive containers which will thoroughly cook the foods contained therein.

The sudden introduction of a heat medium into the containers under pressure, tends to blow or force portions of their contents therefrom, for which reason the registering holes 39 and 40 in the plates 38 and 23, respectively, are provided, so that "blown" portions of the container contents may discharge into the shock chambers 30, from which such discharged contents will subsequently drain again into the containers.

Any superfluous heat medium may exhaust from said shock chambers through the vents 31 in the top plates of the devices.

It will be noted that the cams 20 are formed with surfaces sufficient to hold the plungers with the containers thus in elevated position for a time sufficient to completely and thoroughly sterilize or cook the food contents thereof, this function being aided by the reduced rotational speed of the shaft 18. Upon release of pressure upon the levers 17, the plungers 15 will descend to normal position by virtue of their weight, thus lowering the containers to the level of the platform and allowing the valves 35 to reseat, the parts of the auxiliary heat devices consequently assuming the position shown in Fig. 4. The containers being thus lowered to the level of the platform, the conveyor chains 11 are again set in motion automatically by the clutch (hereinbefore mentioned) to convey the heat treated containers away from the heating devices for the subsequent capping operation, while a successive series of untreated food containers are brought in a similar manner into operable position underlying the heat injectors, thus providing an automatically operated machine in which the successive food containers are periodically drawn forward and then brought to rest in position for the sterilizing or cooking operation, and subsequently conveyed away to a capping machine or device, the complete cycle of operation being sufficiently rapid to treat a large number of food containers in a given period of time.

The simplicity and advantages of my improved automatic sterilizing and cooking apparatus or machine, over other methods heretofore employed for accomplishing the same result will be obvious from the foregoing description.

It will be understood that any preferred heat agent or medium may be supplied through the conduit 22 for accomplishing this result, although steam, or superheated steam is considered preferable.

Since various changes may be made in the details of construction and arrangement of parts without departing from the spirit and scope of my invention, I do not desire to be limited by the appended claims to the specific construction hereinbefore illustrated and described.

Having thus described my invention, what I claim as new and desire to secure by Letters Patent of the United States is:—

1. A sterilizing and cooking apparatus comprising in combination, an element supporting platform, article actuated means arranged above said platform for subjecting a plurality of the articles simultaneously to direct heat treatment, means for delivering a plurality of the articles coincidently subjacent said heat treating means and means for elevating a plurality of the articles coincidently to actuating position thereunder, together with means for coincidently lowering and then removing a plurality of articles after the heating operation has been completed.

2. A sterilizing and cooking apparatus comprising in combination, an element supporting platform, article operated means arranged on said platform for subjecting a plurality of the articles simultaneously to direct heat treatment, automatically operable means for delivering a plurality of the articles coincidently to position for the heating operation, means for simultaneously holding a plurality of the articles in position during the heat treatment and means for conveying and removing a plurality of the treated articles coincidently to and from the platform.

3. A sterilizing and cooking apparatus comprising in combination, an element supporting platform, article actuated means arranged on said platform for subjecting a plurality of the articles simultaneously to direct heat treatment, means for holding a plurality of the articles coincidently in position during the heat treatment and intermittently operable means for delivering a plurality of the articles coincidently to position for the heating operation and simultaneously removing a plurality of heat treated articles from the platform.

4. A sterilizing and cooking apparatus, comprising an oblong element supporting platform, article operated means arranged in spaced series on said platform for subjecting a plurality of articles simultaneously to direct heat treatment, means for delivering a plurality of the articles coincidently to position respectively with relation to said first named means for the heating operation and means for simultaneously removing a plurality of the treated articles from the platform.

5. A sterilizing and cooking device for subjecting open-ended containers to direct heat treatment, comprising a hollow body formed of separable parts providing concentric supply and exhaust chambers, means for connecting the supply chamber in open communication with a source of heat supply, a valve controlled discharge nozzle extending outwardly from said chamber, and a packing plate movably secured on said nozzle adapted to effect communication between a container and the exhaust chamber of said body, when moved by the former in contact with a wall of the latter.

6. A sterilizing and cooking device comprising a separable body having concentrically formed supply and exhaust chambers and means for connecting the supply chamber with a source of heat supply, a valve controlled discharge nozzle extending from said chamber and a packing plate slidably movable thereon, said plate being adapted to establish communication between an open-ended container and the exhaust chamber of said body, when pressed by the former in contact with the latter.

7. A sterilizing and cooking device for subjecting open-ended containers to direct heat treatment, comprising a hollow body formed of separable parts providing non-communicating supply and exhaust chambers, means for connecting the device with the supply chamber in open communication with a source of heat medium supply under pressure, a container actuated valve controllable heat discharge nozzle extending outwardly from said chamber, and a packing plate movably secured on said nozzle adapted to establish communication between the container and the exhaust chamber of said body when moved by the former in contact with an opposing wall of the latter.

8. A sterilizing and cooking device for subjecting open-ended containers to direct heat treatment, comprising a recessed mainplate having a centrally disposed tubular boss extending inwardly from its bottom, a hollow shouldered cap threaded upon said boss and connected with a heat supply conduit, a cover plate engaging upon said shouldered cap and with the margin of said mainplate to form a hollow body having non-communicating supply and exhaust chambers, a valve controlled discharge nozzle secured in said boss in communication with the supply chamber of the device, and a packing plate movably secured on said nozzle between a retaining collar and the outer wall of the main plate, said main and packing plates having registering holes establishing communication between a container and the exhaust chamber of said body when the packing plate is pressed by the former in contact therewith.

9. A sterilizing and cooking device for subjecting open-ended containers to direct heat treatment, comprising a recessed mainplate having a centrally disposed tubular boss extending inwardly from its bottom, a hollow shouldered cap threaded upon said boss and connected with a heat supply conduit, a vented cover plate engaging upon said shouldered cap and with the margin of said main-plate to form a hollow body having non-communicating concentric supply and exhaust chambers, a discharge tube or nozzle secured in said boss in communication with the supply chamber of the device, a normally seated valve having a container and gravity actuating stem projectingly extended through said nozzle for controlling the passage of heat medium therethrough, and a packing plate movably secured on said nozzle between a retaining collar and the outer wall of the main-plate, said main and packing plates having registering holes establishing communication between a container and the exhaust chamber of said body when the packing plate is pressed by the former in contact therewith.

10. A sterilizing and cooking apparatus comprising in combination, an element supporting platform, a series of article actuated means arranged above said platform for subjecting a plurality of the articles simultaneously to direct heat treatment, intermittently operable means for successively delivering a plurality of the articles subjacent said heat treating means in spaced relation therewith, co-ordinately operable means for elevating the delivered articles coincidently to actuating position for and during the heat treatment, together with means for subsequently lowering and removing the treated articles from the platform simultaneously with the delivery of untreated articles thereto.

In testimony whereof I affix my signature.

PAUL STANLEY BAKER.